United States Patent [19]

Zhang et al.

[11] Patent Number: 5,834,137
[45] Date of Patent: Nov. 10, 1998

[54] THIN FILM METHOD OF CONDUCTING LITHIUM-IONS

[75] Inventors: Ji-Guang Zhang; David K. Benson; C. Edwin Tracy, all of Golden, Colo.

[73] Assignee: Midwest Research Institute, Kansas City, Mo.

[21] Appl. No.: 960,606

[22] Filed: Oct. 29, 1997

Related U.S. Application Data

[62] Division of Ser. No. 540,046, Oct. 6, 1995, Pat. No. 5,716,736.

[51] Int. Cl.$^6$ ..................................................... H01M 6/18
[52] U.S. Cl. ........................ 429/193; 204/421; 359/265; 359/270; 427/126.3; 427/430.1; 429/33; 429/218
[58] Field of Search ..................................... 429/193, 218; 204/420, 421, 426; 359/265, 270; 427/126.3, 430.1

[56] References Cited

U.S. PATENT DOCUMENTS

| | | | |
|---|---|---|---|
| 2,497,235 | 2/1950 | Perley | 204/420 |
| 2,668,143 | 2/1954 | Gilbert et al. | 204/420 |
| 3,480,536 | 11/1969 | Arthur | 204/420 |
| 4,768,865 | 9/1988 | Greenberg et al. | |
| 5,312,623 | 5/1994 | Plichta et al. | 429/193 |
| 5,384,653 | 1/1995 | Benson et al. | |
| 5,387,330 | 2/1995 | Taniguchi et al. | 429/193 |
| 5,451,310 | 9/1995 | Behl et al. | 204/426 |

FOREIGN PATENT DOCUMENTS 2633609   6/1988   France .

*Primary Examiner*—Bruce F. Bell
*Attorney, Agent, or Firm*—Ken Richardson

[57] ABSTRACT

The present invention relates to the composition of a solid lithium-ion electrolyte based on the $Li_2O$—$CeO_2$—$SiO_2$ system having good transparent characteristics and high ion conductivity suitable for uses in lithium batteries, electrochromic devices and other electrochemical applications.

1 Claim, 6 Drawing Sheets

THIN FILM METHOD OF CONDUCTING LITHIUM-IONS

This application is a division of application Ser. No. 08/540,046, filed Oct. 6, 1995, now U.S. Pat. No. 5,716,736.

The United States Government has rights in this invention under contract number DE-AC36-83CH10093 between the U.S. Department of Energy and the National Renewable Energy Laboratory, a Division of the Midwest Research Institute.

BACKGROUND OF THE INVENTION

1. Field of Invention

The present invention relates to an inorganic, solid lithium-ion electrolyte material based on the $Li_2O$—$CeO_2$—$SiO_2$ system that has uses in primary and secondary batteries, electrochromic coatings and other electrochemical devices.

2. Description of the State of the Art

Ionic electrolytes are electronic insulators that are also excellent conductors of a specific ion. They are used in electrochemical devices such as primary and secondary (rechargeable) batteries and electrochromic windows and displays and in electrochemical sensors. In electrochemical devices, the mobile ions may migrate through the electrolyte under the influence of a chemical potential or under the influence of an applied electrical potential. In the first case, the complementary, external electronic current is commonly used to provide power as from the discharge of a battery or to produce an electrical signal as in a sensor. In the second case the mobile ions are typically driven from one material into another either to store energy as in charging a secondary battery or to change the properties of a device as in switching an electrochromic device from transparent to opaque condition.

Typical solid electrolytes are metal oxides with mobile ions such as hydrogen, lithium, sodium or oxygen. The electrolytes are required to be solid in applications where the electrochemical device must operate at too high a temperature for liquid electrolytes to be used or where thin films of the electrolyte must be used. Examples of common uses for solid electrolytes include high-temperature zirconium oxide oxygen-ion conductors used in oxygen sensors for controlling the fuel/air mixture ratio in automobile engines; sodium-beta-aluminum oxide sodium-ion conductors used in sodium-sulfur secondary batteries above 300° C. and lithium-doped cobalt oxide solid lithium-ion conductors used in primary and secondary lithium batteries. Solid electrolytes are also used in electrochromic devices where they must also be optically transparent thin films.

Lithium-ion conductors are preferred as solid electrolytes in several applications because they generally combine high ionic conductivity with greater chemical stability than other fast ion conductors such as hydrogen-ion conductors. They can also produce higher voltages in solidstate batteries than can analogous hydrogen-ion conductors. J. B. Goodenough has reviewed the characteristics of fast ionic conduction in solids in the *Proceedings of the Royal Society*, A 393, pages 215–234, 1984.

A U.S. Pat. No. 5,384,653 to Benson et al discloses a stand-alone photovoltaic powered electrochromic window. The electrochromic window includes in its electrochromic coating a solid thin film electrolyte formed of a fast-ion conductor material in which either lithium or hydrogen ions diffuse readily.

Examples of such fast ion conductor materials include: $Li_3N$, $Li_2NH$, and $Li_{1-x}M_xTi_{2-x}(PO_4)_3$, where M represents another metal such as aluminum, chromium, gallium, or the like. Such solid thin film electrolyte layers are typically 1,000 to 5,000 Å thick as disclosed in Benson et al. Although, solid thin film lithium ion conductor material is known as disclosed in Benson et al, they have not demonstrated optimum properties for such electro-optic devices. For example, the $Li_3N$ is not completely transparent and most other solid lithium-ion conductors are not sufficiently conductive at room temperature or are not sufficiently stable against attack by atmospheric gases including water vapor.

U.S. Pat. No. 4,768,865 to Greenberg et al also discloses an electrochromic device having an ion-conductive layer. In this patent, the ion conductive material may be solid, liquid or gel but is preferably disclosed as being a polymer layer.

Lithium ion conductors based on lithium silicate have been investigated by several groups. Most of the previous works focus on the bulk properties of ion-conducting glasses or gels. For example, lithium silicate gel has been reported to have an ionic conductivity of $10^{-3}$ S/cm at 300° C. (Wakamatsu et al, "Effect of Lithium Salts on the Ionic Conductivity of Lithium Silicate Gels," *Journal of Non-Crystalline Solids* 147/148. 1992, 668–671). Sol-gels of the $Li_2O$—$P_2O_5$—$SiO_2$ system have also been used to produce films of solid lithium-ion electrolytes (Hayri et al, "The Preparation and Ionic Conductivity of Sol-gels in the $LiO_2$—$P_2O_5$—$SiO_2$ System," *Journal of Non-Crystalline Solids* 94, 1987, 387–401). The publication acknowledges that many attempts were also made to prepare potassium analogs but that all were unsuccessful.

Xerogels of $(LiCl)_2$—$R_2O_3$—$SiO_2$(R=B, Al, Ga) have also been prepared (Wang et al, "Ionic Conductivity of $(LiCl)_2$—$R_2O_3$—$SiO$ (R–B, Al, Ga) Xerogels," *The Physics of Non-Crystalline Solids*, Vol. 203, 1992, 204–206).

Recently, efforts have been made to prepare lithium silicate in thin film forms (Mouchon et al, "Sol-gel Lithium Silicate Electrolyte Thin Films," *Material Res. Soc. Symp. Proc.* Vol. 346, 1994, 189–199), but no ionic conductivity data were reported for these thin films.

The French patent, 26 33609, to Arribart et al discloses the use of a cerium oxide counter electrode for electrochromic applications. A $TiO_2$—$CeO_2$ system has also been proposed to replace $CeO_2$ as the counter-electrode in electrochromic devices. The use of $CeO_2$ has a disadvantage in that its electrochromic reaction kinetics are slow.

A U.S. Pat. No. 5,387,330 to Taniguchi et al further discloses a mixed-oxide solid hydrogen-ion and oxygen-ion mixed ionic conductor for use in electrochromic devices, fuel cells and sensors. The patent is specifically directed to a mixed ion conductor having the composition $BaCeO_xGd_yO_{3-a}$.

SUMMARY OF THE INVENTION

It is the object of the instant invention to provide an inproved solid lithium-ion electrolyte that has high visible transparency and high lithium-ion conductivity with a low electronic conductivity.

It is a further object of the instant invention to provide a three component system lithium-ion conductor that is useful in electrochromic devices as well as battery, and other devices.

It is an additional object of the instant invention to provide a lithium-ion conductor with optimum lithium-ion transport qualities.

A specific object of this invention is to provide an improved method of transmitting lithium ions between two different materials in eletrochromic, battery, and other electrochemical devices.

The instant invention is directed to a solid lithium-ion electrolyte based on the $Li_2O$—$CeO_2$—$SiO_2$ system. Thin films of this material have been prepared by the sol-gel technique. The lithium-ion conductor is also highly transparent, making it very suitable for use in electrochromic devices.

BRIEF DESCRIPTION OF THE DRAWINGS

The accompanying drawings are incorporated in and form a part of the specification together with the description to explain the principles of the invention. The drawings are illustrative and the various elements are not to proper scale.

DETAILED DESCRIPTION OF THE INVENTION

Silicon dioxide forms a glass which is a good amorphous matrix to accommodate other metal oxides. Cerium oxide, when added to the glass, modifies the silicon dioxide matrix, making it more open and facilitates the migration of small ions such as lithium. The modified silicate glass structure offers many vacant sites that can be occupied by the mobile ions and can serve as preferred pathways for ion migration. The addition of $Li_2O$ provides a large lithium ion background concentration and facilitates the lithium-ion transport.

Ion conductors based on the mixed oxides of lithium, cerium and silicon, ($Li_2O$—$CeO_2$—$SiO_2$) are prepared by the sol-gel method. This is a method wherein an appropriate solution is prepared and coated on a substrate to form a film. The resulting film is then dried at an elevated temperature. The source materials may typically include lithium nitrate ($LiNO_3$), ammonium-cerium-nitrate ($Ce(NH_4)_2(NO_3)_6$), and tetraethoxysilane ($Si(OC_2H_5)_4$ or TEOS). The lithium source ($LiNO_3$) can be replaced by either LiCl or LiBr. The amount of water added affects the time from solution preparation to final solid gel formation; increasing the water content increases the time for solid formation.

Figure 1:
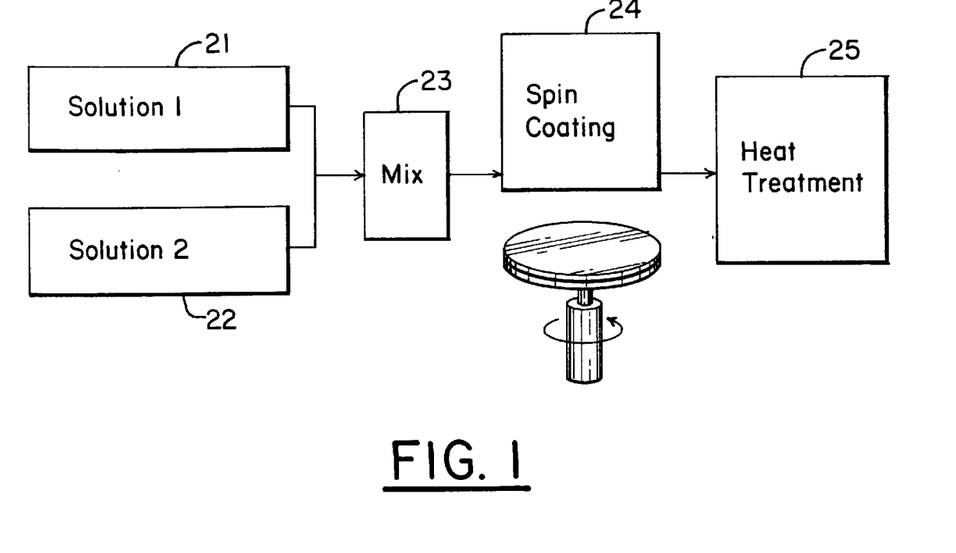
FIG. 1 is the film-preparation flow chart for a typical solid ionic electrolyte film.

The preparation procedure for a typical solid electrolyte film is depicted in FIG. 1. The following description is for a 20% $Li_2O$-20% $CeO_2$ -60% $SiO_2$ by molar electrolyte although the basic procedure was used for all examples. The lithium nitrate, (0.04 mol), and ammonium-cerium-nitrate, (0.02 mol), were dissolved in water, (1.8 mol), as the solution 1 depicted at 21.

Tetraethoxysilane, (TEOS), (0.06 mol) is dissolved in the same volume of ethanol and forms the solution 2 depicted at 22. The two solutions were then poured together and mixed 23 with a magnetic stirrer at 50° C. for several hours. The resulting transparent solution was used as the precursor for sol-gel film deposition.

The resulting lithium-cerium-silicon mixed oxide precursor was coated on substrates by the well known spin-coating method 24 using typical speeds and times of 2000 rpm and 30 seconds, respectively. The resulting films were slowly dried in air for about 30 minutes, then baked, 25, at 200° C. to 300° C. for approximately 10 minutes in either ambient air or oxygen environments. A typical film prepared under these conditions is about 500 nm thick. It is understood that the basic spin coating process is known and that conditions such as the precursor viscosity, spin speed and time can be varied to control the thickness of the film. Also, other coating processes, such as sputtering, evaporation and dip coating can be used. These are only representative and it is understood that additional known coating processes are also applicable.

These films are robust when subjected to either mechanical scratch or chemical corrosion testing. They are quite stable in both basic and acidic solutions.

The ionic conductivities of the films were measured by electrode impedance spectroscopy using a frequency range of 5 MHz to 50 kHz. The ionic conductivity of the prepared films was on the order of $10^{-6}S$ $cm^{-1}$ at 20° C. when prepared at bake out temperatures within the range of 200°–300° C.

Figure 2:
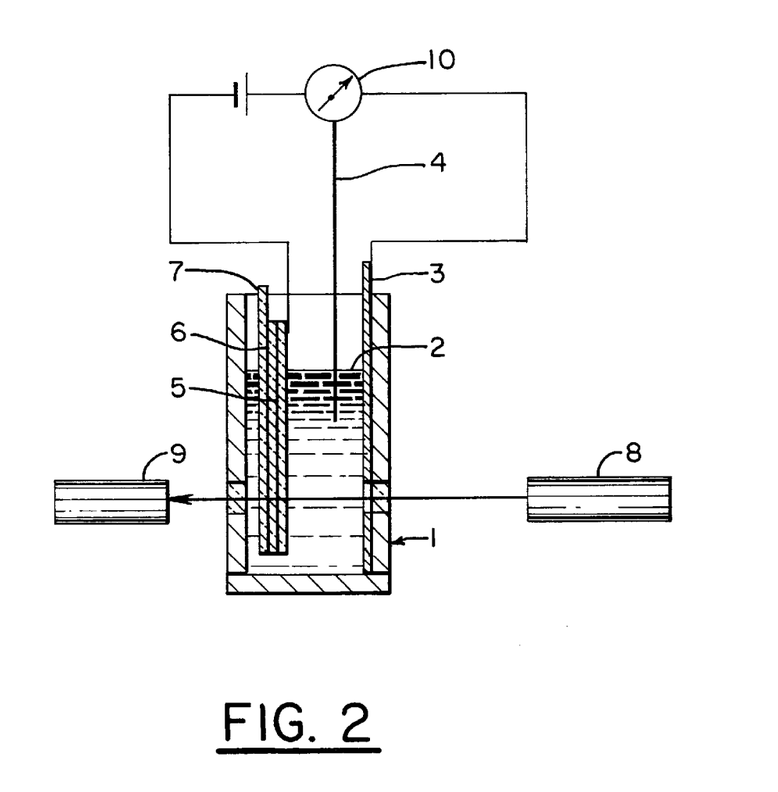
FIG. 2 is a schematic of an electro-optical measurement set-up for half-cells comprising an ion conductor film (solid ion electrolyte) deposited on top of a coated glass substrate.

The electro-optical properties of $Li_2O$—$CeO_2$—$SiO_2$ films were investigated in various configurations. Thin films were deposited on transparent conductor (TC) coated glass substrates or on WO$_3$/TC half-cells. They were tested in an electrochemical cell as shown in FIG. 2. The electrochemical cell 1 of FIG. 2 includes a 1 molar solution, (depicted at 2) of LiClO$_4$ in propylene carbonate as a lithium-ion source. Lithium metal is used as both counter electrode 3 and reference electrode 4. The thin film ion conductor shown at 5 was deposited on WO$_3$ (depicted at 6) on an ITO or SnO$_2$-coated substrate 7. The coated glass substrate is formed by pre-coating with a transparent conductor (TC) layer of tin-doped indium oxide (ITO) or tin oxide (SnO$_2$) which in turn is covered by the layer of electrochromic tungsten oxide (WO$_3$) 6. These substrate designs are denoted as WO$_3$/TC substrates. The optical transmittance of the half cells were measured by using a diode laser, (8), having a wavelength of ~788 nm or 670 nm in conjunction with the light detector (9). The device power was provided by a potentiostat (10). All measurements were controlled and recorded by a computer.

Example 1

Figure 3:
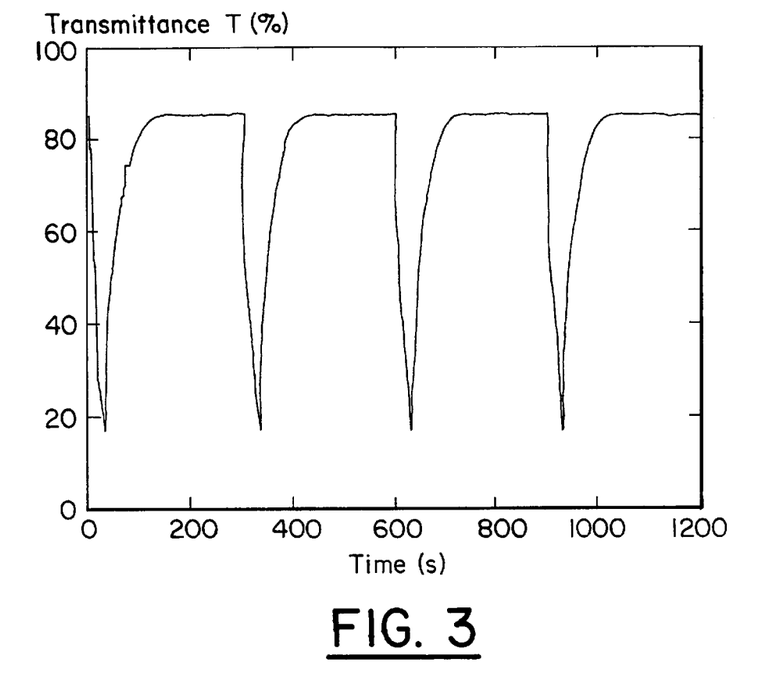
FIG. 3 depicts in graph form the electro-optical properties of a half-cell with an ion conductor film (~500 nm thick) deposited on a 900 nm $WO_3$/ITO substrate. The film is formed of 20% $Li_2O$-20% $CeO_2$-60% $SiO_2$ molar) and is colored/bleached at ±1.5 V.

The ion conductor of this example consists of 20% Li$_2$O, 20% CeO$_2$, and 60% SiO$_2$ (molar) or molar proportions of 1:1:3. The chemical ingredients to prepare the ion conductor were 2.758 grams of LiNO$_3$, 10.965 grams of ammonium-cerium-nitrate, 13.1 ml of TEOS, and 13.1 ml of ethanol The water amount was controlled to produce a molar ratio of water to TEOS equaling approximately 30 (32.4 ml of water). The chemicals were measured and mixed and coated as stated above. The resulting ion conductor film was about 500 nm in thickness, and its electro-optical properties are shown in FIG. 3. The transmittance (measured at $\lambda$=788 nm) depicted in FIG. 3 is for the half-cell including the ion conductor film deposited on a 900 nm WO$_3$/ITO substrate. The half-cell was repetitively operated (colored and bleached) at ±1.5 volts relative to the resting potential of WO$_3$ film, which is 3.2 V above the lithium reference electrode.

Figure 4:
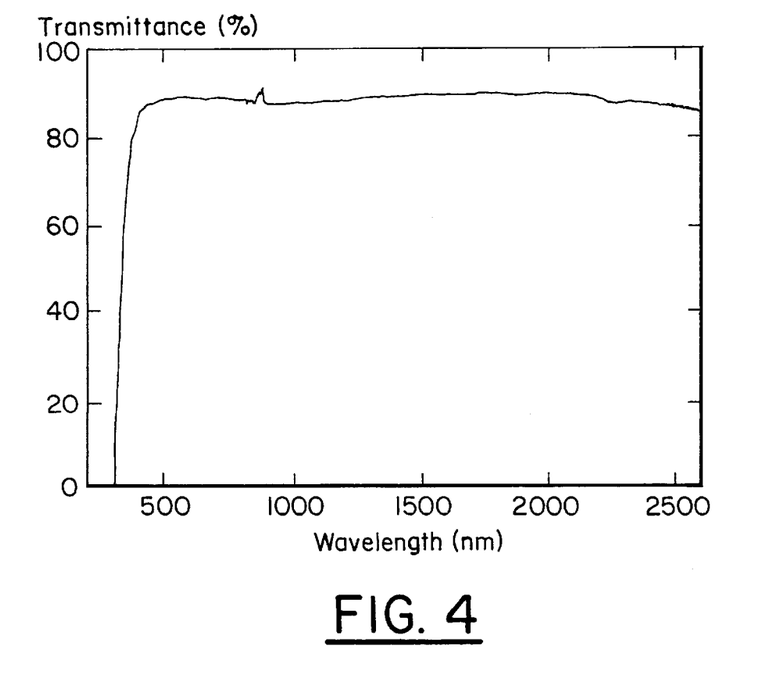
FIG. 4 illustrates the optical transmittance spectra of a solid lithium ion electrolyte film deposited on a Pyrex glass substrate. The film is 500 nm thick and is formed of 20% $Li_2O$-20% $CeO_2$-60% $SiO_2$(molar).

The films were tested using the configuration of FIG. 2. FIG. 4 shows the transmittance of the film of Example 1 deposited on a pyrex glass substrate. The solar-weighted transmittance of the film and substrate is 87.6%, and the transmittance in the visible range is approximately 91%. Considering that the visible transmittance of the pyrex substrate by itself is approximately 92%, the high transmittance of this material makes it ideal for electrochromic applications.

Example 2

A 500 nm thick film of the mixed lithium-cerium-silicon oxide was deposited by spin coating onto an ITO-coated glass substrate and onto a 900 nm WO$_3$/ITO substrate. The composition of the mixed oxide was 10% Li$_2$O, 30% CeO$_2$, and 60% SiO$_2$ (molar).

Figure 5:
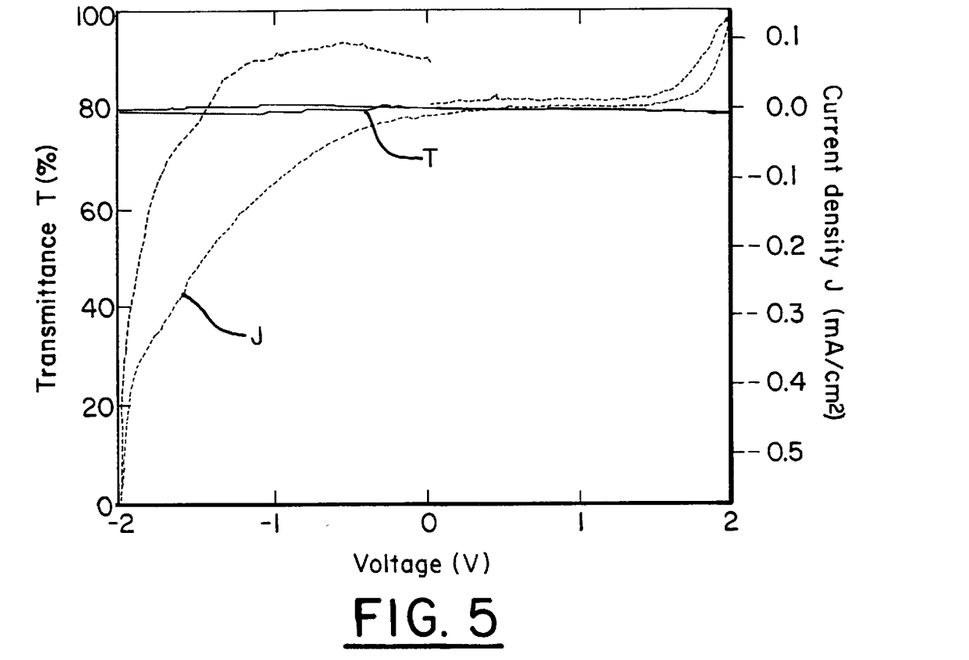
FIG. 5 depicts in graph form the electro-optical properties of a solid lithium-ion electrolyte film measured by cyclic voltammetry. The film is 500 nm thick, and is formed of 10% $Li_2O$-30% $CeO_2$-60% $SiO_2$ (molar) deposited on an ITO substrate (without a $WO_3$ film between the solid electrolyte and ITO).

The electro-optical properties of this mixed oxide ion-conductor film deposited on ITO substrate (without any WO$_3$) were measured by cyclic voltammetry and shown in FIG. 5. The ion conductor film was swept between ±2V at a rate of 10 mV/s. Transmittance ($\lambda$=788 nm), shown at T, exhibited virtually no change in this voltage range indicating that insertion of the Li+ ion does not change the optical properties of the mixed oxide film itself.

Figure 6:
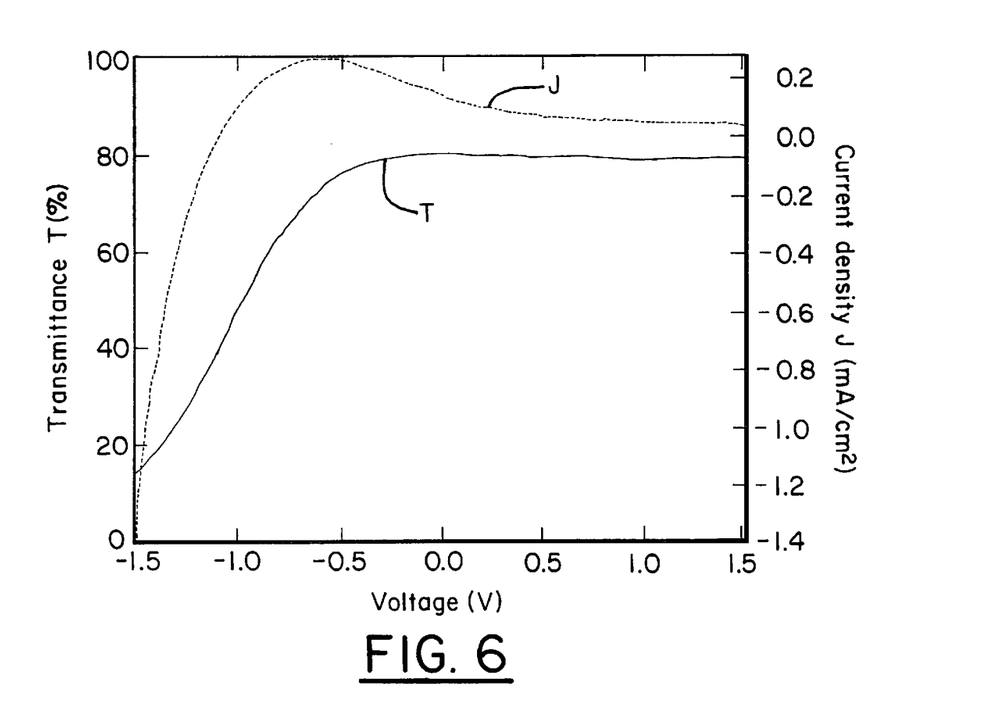
FIG. 6 depicts in graph form the electro-optical properties of a half-cell with a lithium-ion electrolyte film measured by cyclic voltammetry. The film is 500 nm thick, and is formed of 10% $Li_2O$-30% $CeO_2$-60% $SiO_2$ (molar) deposited on a 900 nm $WO_3$/ITO substrate.

The electro-optical properties of a half-cell containing the same 500 nm mixed-oxide conductor deposited on a 900 nm WO$_3$ITO substrate were also measured by cyclic voltammetry. The ion conductor/WO$_3$ film was scanned between ±1.5 V at 10 mV/s. The resulting recording is shown in FIG. 6. The half-cell was colored showing a decrease in transmittance ($\lambda$=788 nm) from approximately 78% to approximately 15%. This shows the ions easily diffuse through the ion conductor and color the tungsten oxide film.

Example 3

Figure 7:
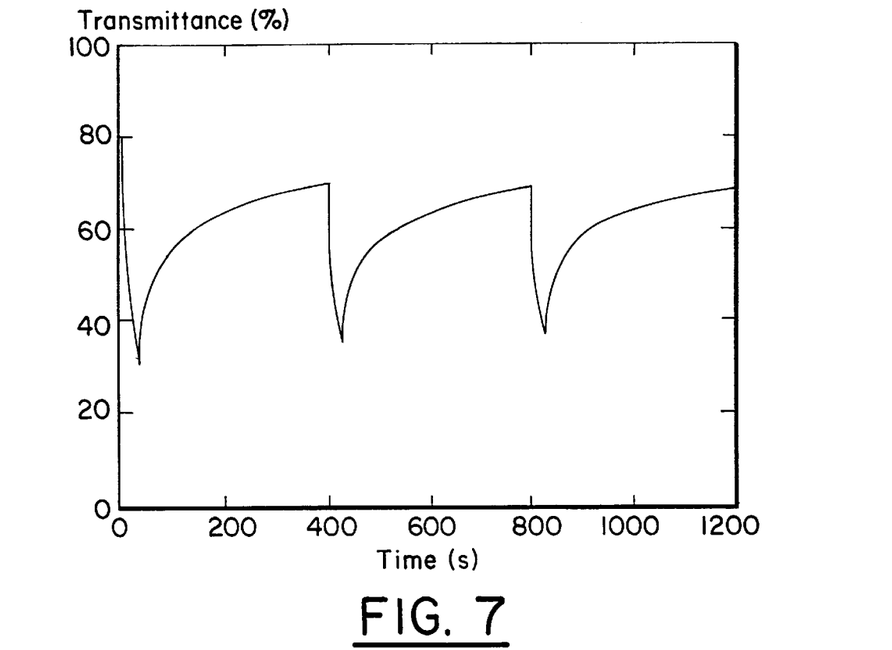
FIG. 7 depicts in graph form the electro-optical properties of a half-cell with a lithium-ion electrolyte film that is 500 nm thick and is formed of 30% $Li_2O$-20% $CeO_2$-50% $SiO_2$ (molar) deposited on a 900 nm $WO_3$ITO substrate.

A 500 nm thick film of the mixed lithium-cerium-silicon oxide was deposited by spin coating onto a 900 nm WO$_3$/ITO substrate. The composition of the mixed oxide was 30% Li$_2$O, 20% CeO$_2$, and 50% SiO$_2$ (molar). The electro-optical properties of this half-cell are shown in FIG. 7. This half-cell was repetitively colored and bleached at ±1.5 V. The transmittance was measured at $\lambda$=788 nm.

Example 4

Figure 8:
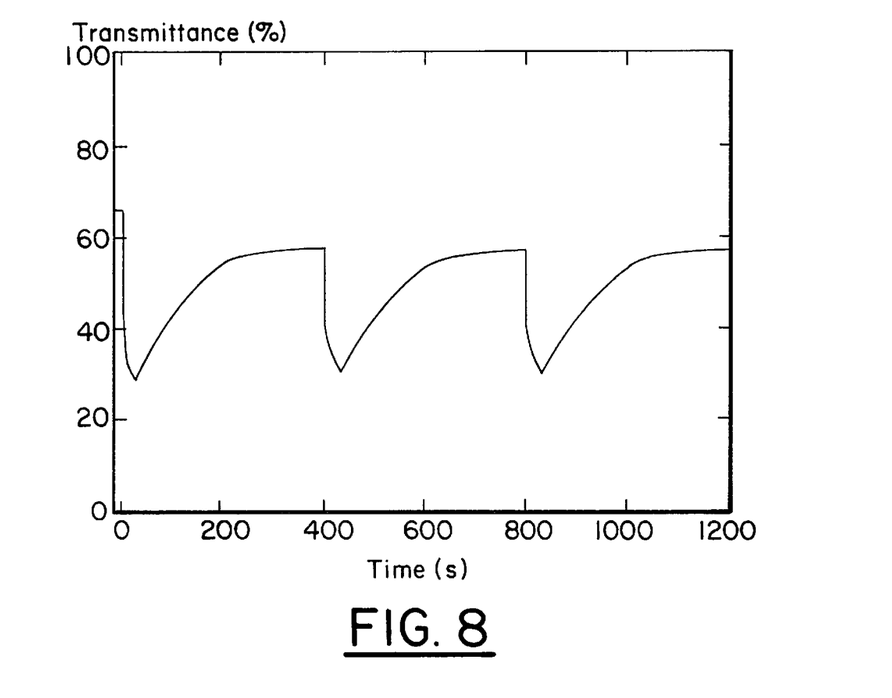
FIG. 8 depicts in graph form the electro-optical properties of a half-cell with a lithium-ion electrolyte film that is 500 nm and formed of 30% $Li_2O$-10% $CeO_2$- 60% $SiO_2$ (molar) deposited on a 900 nm $WO_3$/ITO substrate.

A 500 nm thick film of the mixed lithium-cerium-silicon oxide was deposited by spin coating onto a 900 nm WO$_3$/ITO substrate. The composition of the mixed oxide was 30% Li$_2$O, 10% CeO$_2$ 60% SiO$_2$ (molar). The electro-optical properties of this half-cell are shown in FIG. 8. This half-cell was repetitively colored and bleached at ±1.5 V. The transmittance was measured at $\lambda$=788 nm.

Example 5

A 400 nm thick film of the mixed lithium-cerium-silicon oxide was deposited by spin coating onto a 700 nm WO$_3$/ITO substrate. The composition of the mixed oxide was 25% Li$_2$O, 15% CeO$_2$, and 60% SiO$_2$ (molar).

Figure 9:
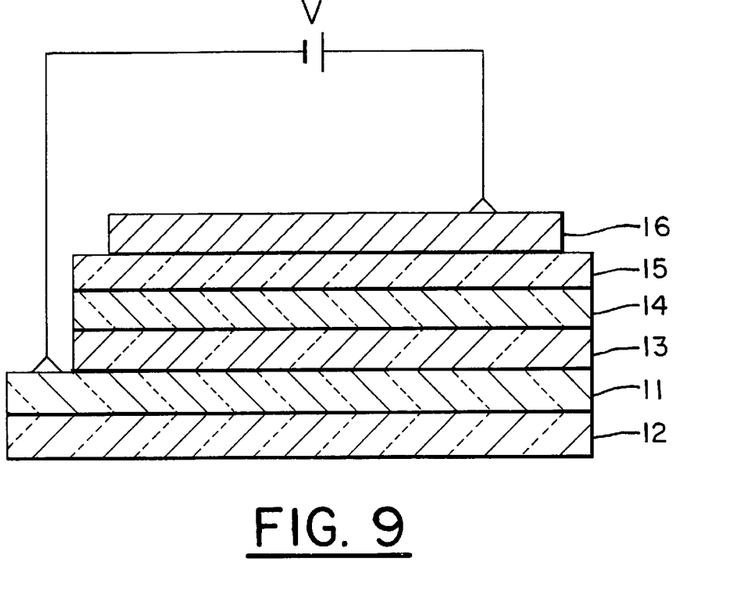
FIG. 9 illustrates in cross-section transmissive electrochromic device using the ion conductor layer in accordance with the instant invention.

An electrochromic device using the lithium-ion conductor has been made with tungsten oxide as the electrochromic material and vanadium oxide as a lithium-ion storage material. The device has a structure of glass/SnO$_2$/WO$_3$)ion conductor/V$_2$O$_5$/Au as shown in FIG. 9 although other materials can be used for the electrochromic layer, ion storage layer, and the transparent conductor layers as disclosed in a U.S. Pat. No. 5,384,653 to Benson et al incorporated by reference. To prepare the cell, SnO$_2$, 11, is coated on a glass substrate 12. The WO$_3$ film 13 (approximately 600 nm thick) is deposited on the SnO$_2$ coated substrate. The film 13 was then pre-injected with lithium by thermal evaporation of a 50 nm thick film of lithium metal onto the WO$_3$ in a vacuum at 120° C. where lithium spontaneously diffuses into the WO$_3$ film to form a bluish-colored compound Li$_x$WO$_3$. The ion conductor 14 (approximately 500 nm thick) was spin-coated on top the lithiated WO$_3$ film and thermally treated as set forth above. A$_2$V$_5$O counter-electrode (15) (approximately 90 nm thick) and a top Au contact (12) (approximately 12 nm thick) were then evaporated on the top of the ion conductor in a subsequent operation.

When a positive potential is applied to the colored tungsten oxide (Li$_x$WO$_3$), lithium ions are moved from the tungsten oxide through the solid electrolyte into the vanadium oxide and the tungsten oxide changes from a partially opaque blue color to transparent. Then, when a negative potential is applied to the transparent tungsten oxide (WO$_3$), the lithium ions are moved back from the vanadium oxide through the solid electrolyte into the tungsten oxide layer and the device returns to the partially opaque condition.

Figure 10:
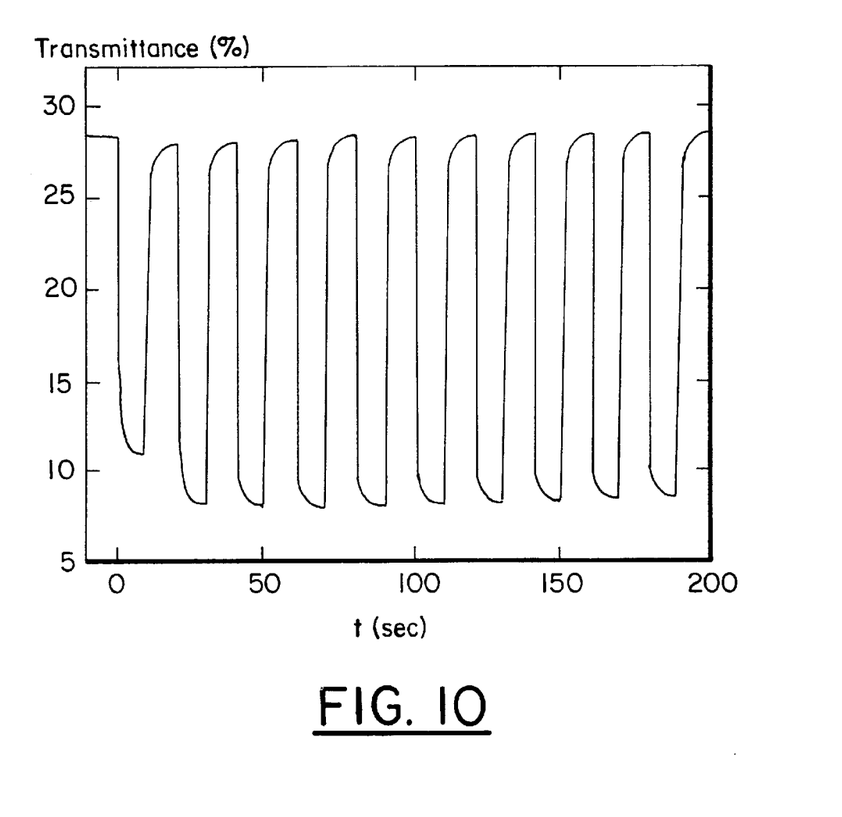
FIG. 10 illustrates in graph form the electro-optical properties of an electrochromic device using the ion conductor of Example 5 and the construction of FIG. 9. The device has a structure of glass/$SnO_2$/50 nm Li-600 nm $WO_3$/500 nm of ionic conductor/90 nm $V_2O_5$/12 nm Au.

FIG. 10 shows the changing optical transmittance (measured at wavelength $\lambda$=670 nm) of the typical device of FIG. 9 with an active area of 2.55 cm$^2$ when operated at ±3 V. The transmittance of the device rapidly changed from 28% to 9% in less than 10 sec. If the Au top-contact were replaced by a transparent conductor layer with the visible transmittance of 85%, the transmittance of the device in the bleached state could be increased to approximately 55%.

Example 6

Figure 11:
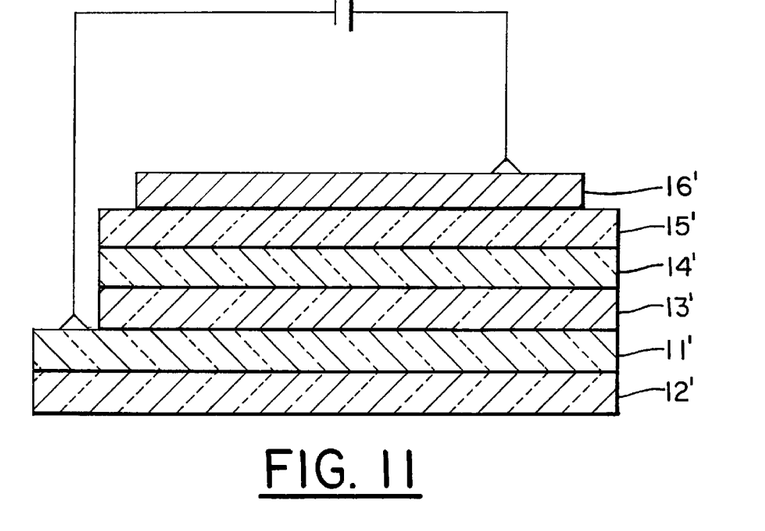
FIG. 11 illustrates in cross-section a reflective electrochromic device using the ion conductor of the instant invention.

A reflective electrochromic device was prepared by utilizing the ion conductor film (20% $Li_2O$, 20% $CeO_2$, and 60% $SiO_2$) of Example 1. The device has a similar structure as shown in FIG. 11. The Au reflective layer, 16', is approximately 40 nm thick; the $V_2O_5$ layer, 15', approximately 100 nm thick; the ion conductor layer, 14', approximately 500 nm thick; and the $WO_3$ layer, 13', approximately 700 nm thick. The $WO_3$ layer 13' was deposited on the $SiO_2$ 11', glass substrate 12'. The device was prepared in a similar manner as described in the Example 5.

Figure 12:
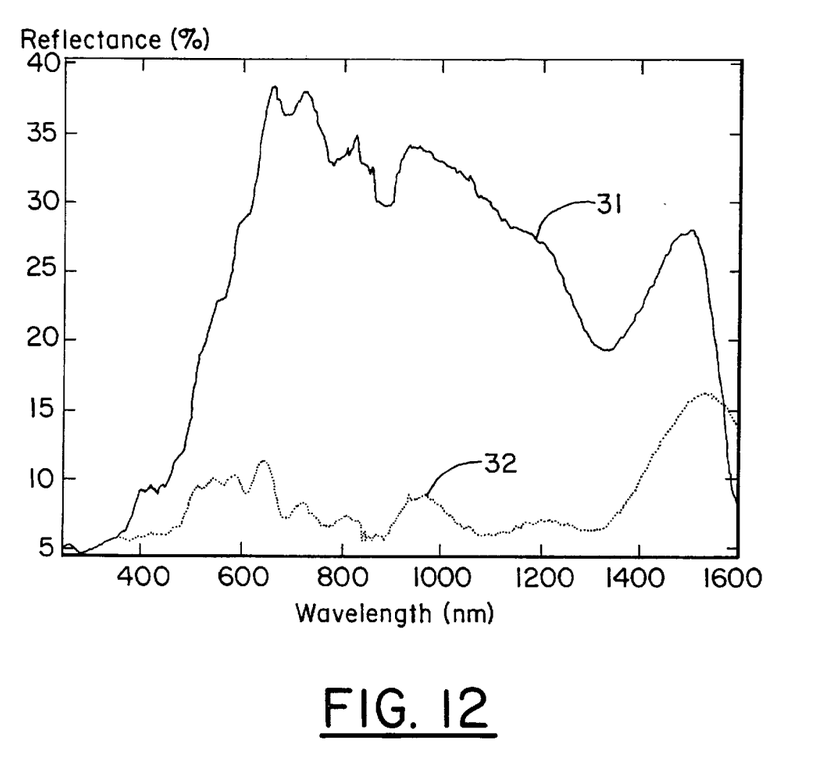
FIG. 12 illustrates the optical reflectance spectra of the reflective electrochromic device of FIG. 11 in both the bleached and colored states. The device has a structure of glass/$SnO_2$/50 nm Li-700 nm $WO_3$/500 nm of ionic conductor/100 nm $V_2$ $O_5$ /40 nm Au, where the ion conductor described in Example 1 was used.

The optical spectra of the reflective electrochromic device incorporating the ion conductor of Example 1 and operated at ±3 volts are shown in FIGS. 12. The solid line 31 in FIG. 12 shows the optical reflectance of the device in bleached state. The dotted line 32 shows the optical reflectance of the device in colored state. The light was incident from the glass side, 12', of the device in FIG. 11. All of the optical spectra were measured on a Perkins-Elmer 340 spectrophotometer.

Specific examples of electrolyte or conductor material based on the $Li_2O$—$CeO_2$—$SiO_2$ system have been described above. It is understood that the specific examples are representative and that other ratios may be used with good electro-optical characteristics. Specifically, the electrolyte material can comprise molar percentages of 10%–30% $Li_2O$, 10%–30% $CeO_2$, and 50%–60% $SiO_2$ by molar.

The foregoing descriptions are considered as illustrative only as to the principles of the invention. Further, since numerous modifications and changes will readily occur to those skilled in the art, it is not desired to limit the invention to the exact construction and process as described above. Accordingly, all suitable modifications and equivalents may be resorted to falling within the scope of the invention as defined by the claims as follows.

We claim:

1. A method of transmitting lithium ions between two different materials, comprising the steps of:

positioning an electrolyte material comprising a solid, thin film mixture of oxides of lithium, cerium, and silicon between said two different materials; and applying an electric potential between said two different materials and across said electrolyte material.

* * * * *